United States Patent [19]

Tech

[11] 4,021,776
[45] May 3, 1977

[54] PATTERN RECOGNITION SYSTEM

[75] Inventor: Donald D. Tech, Chelmsford, Mass.

[73] Assignee: Inforex, Inc., Burlington, Mass.

[22] Filed: Nov. 19, 1974

[21] Appl. No.: 525,067

[52] U.S. Cl. .............. 340/146.3 MA; 340/146.3 Y
[51] Int. Cl.$^2$ ........................................ G06K 9/00
[58] Field of Search .......... 340/146.3 MA, 146.3 Y

[56] References Cited

UNITED STATES PATENTS

| | | | |
|---|---|---|---|
| 3,136,977 | 6/1964 | Lamy et al. ............. | 340/146.3 MA |
| 3,173,126 | 3/1965 | Rabinow et al. ........ | 340/146.3 MA |
| 3,184,712 | 5/1965 | Holt ......................... | 340/146.3 MA |
| 3,290,651 | 12/1966 | Paufve et al. ........... | 340/146.3 MA |
| 3,496,542 | 2/1970 | Rabinow .................. | 340/146.3 MA |
| 3,618,016 | 11/1971 | Van Steenis ............. | 340/146.3 Y |
| 3,713,099 | 1/1973 | Hemstreet ................ | 340/146.3 Y |

*Primary Examiner*—Joseph M. Thesz
*Attorney, Agent, or Firm*—Woodcock Washburn Kurtz & Mackiewicz

[57] ABSTRACT

A pattern recognition system includes a magnetic core correlator which is used for recognizing a pattern being scanned. A bit train of digital signals, describing the input image, is applied to a plurality of serially connected shift registers so that a train of pulses is stored in the shift registers. Selected bit positions from certain of the shift registers are connected to drivers which drive an array of magnetic cores with flux changes in a pattern corresponding with the stored input image. The array of magnetic cores has a group of sense lines, one sense line for each of the different patterns to be recognized. Each sense line has a winding on selected cores with the windings connected in series. Certain of the windings on a given sense line are aiding and the remaining windings are opposing so that the pattern of flux changes in the cores creates voltages on the windings which are additive when signals closely representing the pattern being recognized are applied to said drivers.

9 Claims, 4 Drawing Figures

PATTERN RECOGNITION SYSTEM

BACKGROUND OF THE INVENTION

This invention relates to pattern recognition systems and more particularly to a pattern recognition system using a linear magnetic core array. Some pattern recognition systems use the technique of mask matching. This procedure involves the comparison of the input image to a group of masks which describe the patterns to be recognized, and selecting which of the masks of the group most closely resembles the input image. The straightforward approach is to test each mask against the input image and accumulate a "similarity count" for each mask. The counts are then examined to insure that a minimum has been reached and that there is a sufficient differential between the required minimum count and the next best count. At this point, the system character code is encoded by the corresponding mask which rendered the valid count and the character code is passed to the user.

An example of a system in which points of recognition are counted is shown in U.S. Pat. No. 3,713,099. The procedure emplyed therein involves the comparison of a character recorded on a magnetic drum. An "anti-coincidence" comparison is made through "or-not-and" circuitry. Although other patents make use of magnetic devices for mask storage, there is no suggestion in the known prior art of utilizing a linear core matrix which will project the entire font upon the input image and provide a signal on each sense line representing the degree of similarity between said image and each of the patterns in the font.

SUMMARY OF THE INVENTION

In accordance with this invention, a linear magnetic core matrix is used in a technique of mask matching which provides high speed, high resolution pattern recognition.

In accordance with another aspect of the invention, a magnetic core array is driven by digital signals representing the image. The magnetic cores undergo flux changes in a pattern corresponding with the digital signals. A group of sense lines is wound on the magnetic core array, one sense line for each of the different patterns to be recognized. Each sense line has a winding of selected magnetic cores. The windings of each line are connected in series, with certain of the windings aiding so that the pattern of flux changes in the cores causes voltages on the windings which are additive when signals closely representing the pattern being recognized are applied to the drivers.

More particularly, in accordance with one embodiment of the invention, each pattern is specified by a 5 × 9 matrix of stroke intersections. The resolution of the image describes each of the resulting 45 stroke intersections as a 7 × 7 matrix of image bits. The bit dimensions of the entire pattern are then 35 × 63. A single scan (bottom to top) of the document will provide 128 bits or just over twice the pattern height. The 63 bits relevant to the pattern will occur somewhere within the string of 128 bits of the scan. As the scanning continues with document motion, the 128 bit scan bits are loaded into a series of 128 bit shift registers shifting end-to-end. This can be visualized as a 35 turn helix whose circumference is 128 bits in length. On the surface of this helix we would see the image spin around the helix at the bit rate as well as moving axially across the helix at the scan rate. After 4480 bit times (128 × 35), a 35 × 63 bit image would be in full view on the surface of the helix, and there would be 49 opportunities to examine the corresponding bits of each of the 45 stroke intersections. Rather, a single bit from each stroke intersection is made available, and the entire image is eventually positioned on the helix so as to make available each of the 49 bits in each of the 45 stroke intersections at each of the 45 bit windows. The 45 bit windows are used to transform the bits now observed, to a pattern of flux changes within the core matrix. The core matrix is threaded with sense lines (one for each reference pattern) in such a way that when the input image corresponds exactly with the shape of a give reference pattern, then every core in the array will add voltage to the sense line for that pattern. The direction of threading of the sense line through a given core is thus dependent upon whether the bit would be on or off in the image was a perfect match with that of the sense line. If a disagreement occurs between the threaded direction and the image bit, not only is the addition lost, but there is a subtraction of voltage. It is in this manner that the core array is, in fact, a bipolar correlator. In the preferred embodiment, a perfect match would yield +45 units whereas a perfect mismatch would be −45 units, a unit being defined as the value of induced voltage across a single winding of a single core of a sense line of the group.

The 5 × 9 matrix of separated bits on the surface of the helix present an image to the recognition process and this image is interrogated for the degrees of similarity with all reference patterns. The image undergoes eventual convolution with the entire font at a resolution ratio of 49:1.

Voltage comparators are used at each sense line to detect the degree of similarity to each pattern. If found to be sufficient, one or more latches are set such that when collectively reset, increasing "crossing counts" effect the recognition.

The foregoing objects, features and advantages of the invention will be better understood for the following more detailed description and appended claims.

DESCRIPTION OF A PREFERRED EMBODIMENT

Figure 1:
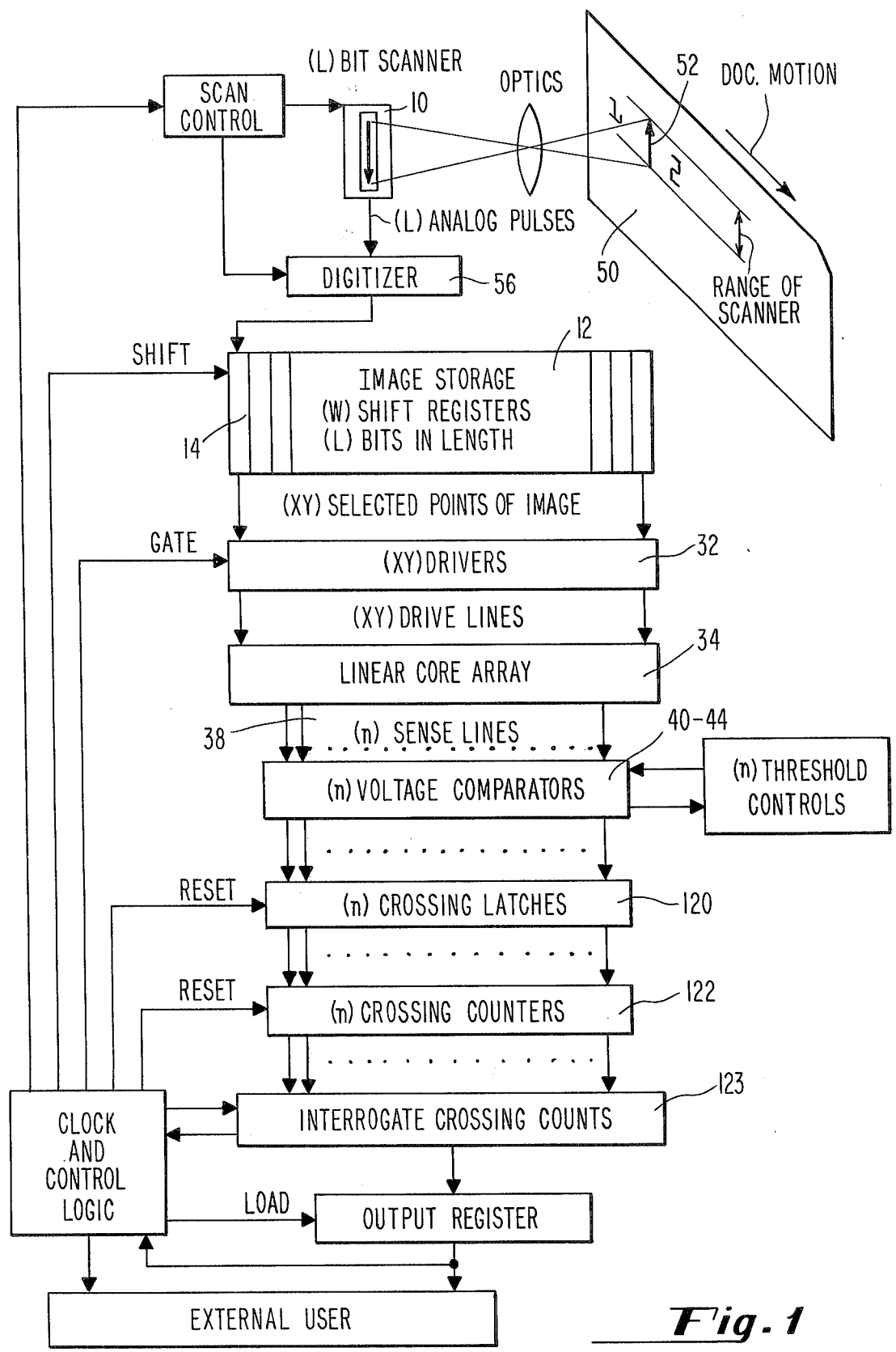
FIG. 1 is a block diagram of the entire system.

Referring to FIG. 1, a scanner 10 scans a moving document 50 and produces analog signals representing the relative darkness of the document along the line scanned 52. As an example of the type of scanner which can be used, the Reticon solid state scanner RL-128 series available from Reticon Corporation, Mountainview, Calif., is suitable. This type of scanner has 128 photocells in a row. One photocell is read at a time so that there are 128 pulses representing the relative light or darkness of the document along the line 52 perpendicular to the motion of the document.

Figure 2:
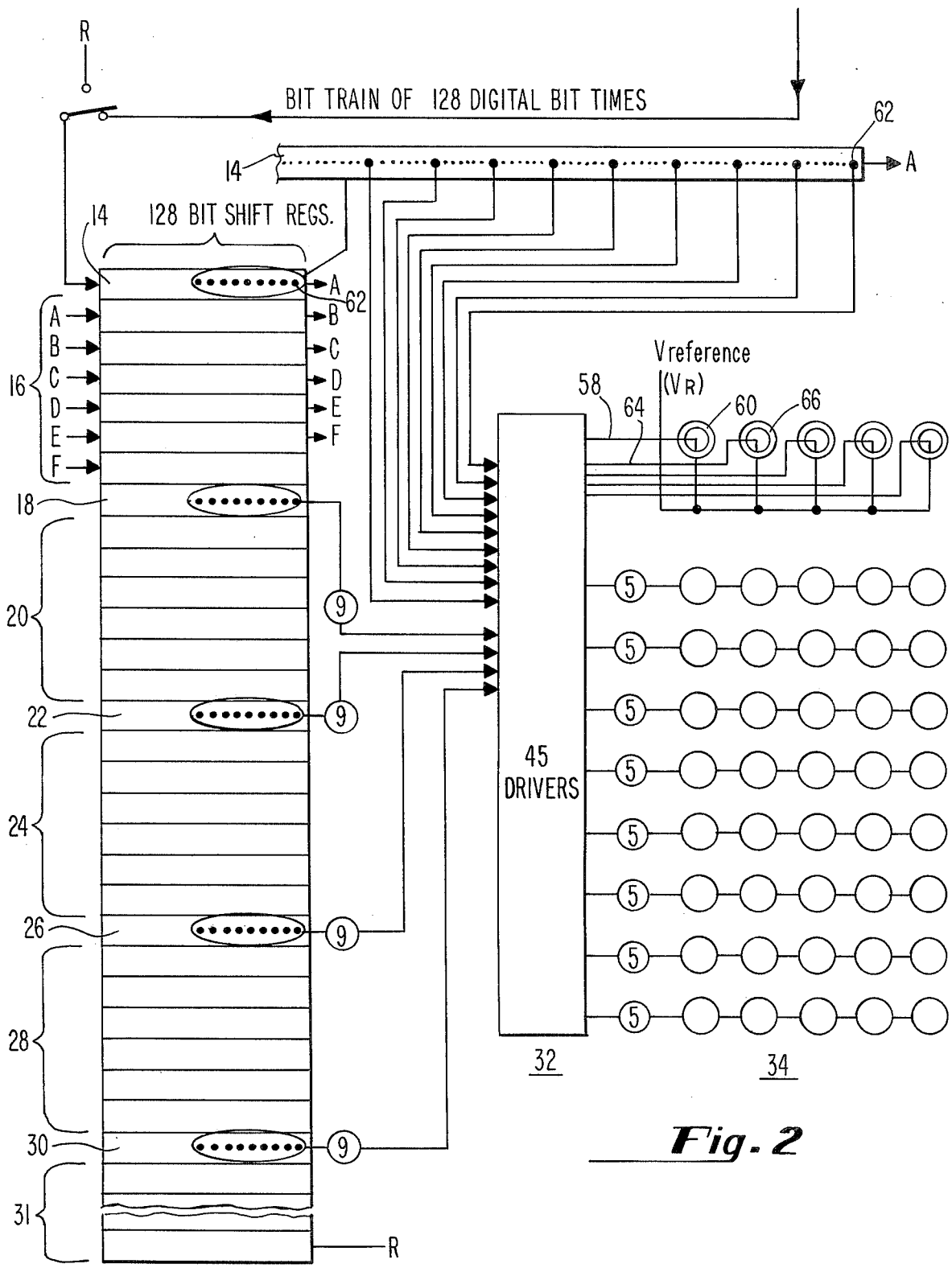
FIG. 2 shows the shift registers, drivers and magnetic core array whereby the input image is transformed into a pattern of flux changes.

The analog signal which is the output of the scanner is digitized by digitizer 56 to produce a bit train of digital signals representing whether discrete points along the line scanned were black or white. This bit train of digital signals is applied to a set of shift registers 12. FIG. 2 shows this set as 35 shift registers connected in series. Each bit train of digital signals from the scanner is applied to the first shift register 14 in the series. Each shift register has enough bit positions to store one scanned line. The shift register 14 has an output from 9 bit positions. This is designated by the notation that the shift register has nine taps. There are six shift registers indicated at 16 with no output taps. The single shift register 18 has nine taps; the six shift registers 20 have no taps; the single shift register 22 has nine taps; the six shift registers 24 have no taps; the single shift register 26 has nine taps; the six shift registers 28 have no taps and the single shift register 30 has nine taps; the shift register 31 has no taps and is used only to provide the capability of recirculating an entire image. The result is an output of 45 bits which are applied to the 45 drivers which are designated 32. These drivers drive the linear magnetic core array 34. Each core on the array has a drive winding connected to the output of one of the drivers. The magnetic cores undergo magnetic flux changes in a pattern corresponding with the 45 digital signals on the taps of the shift register 12.

Figure 3:
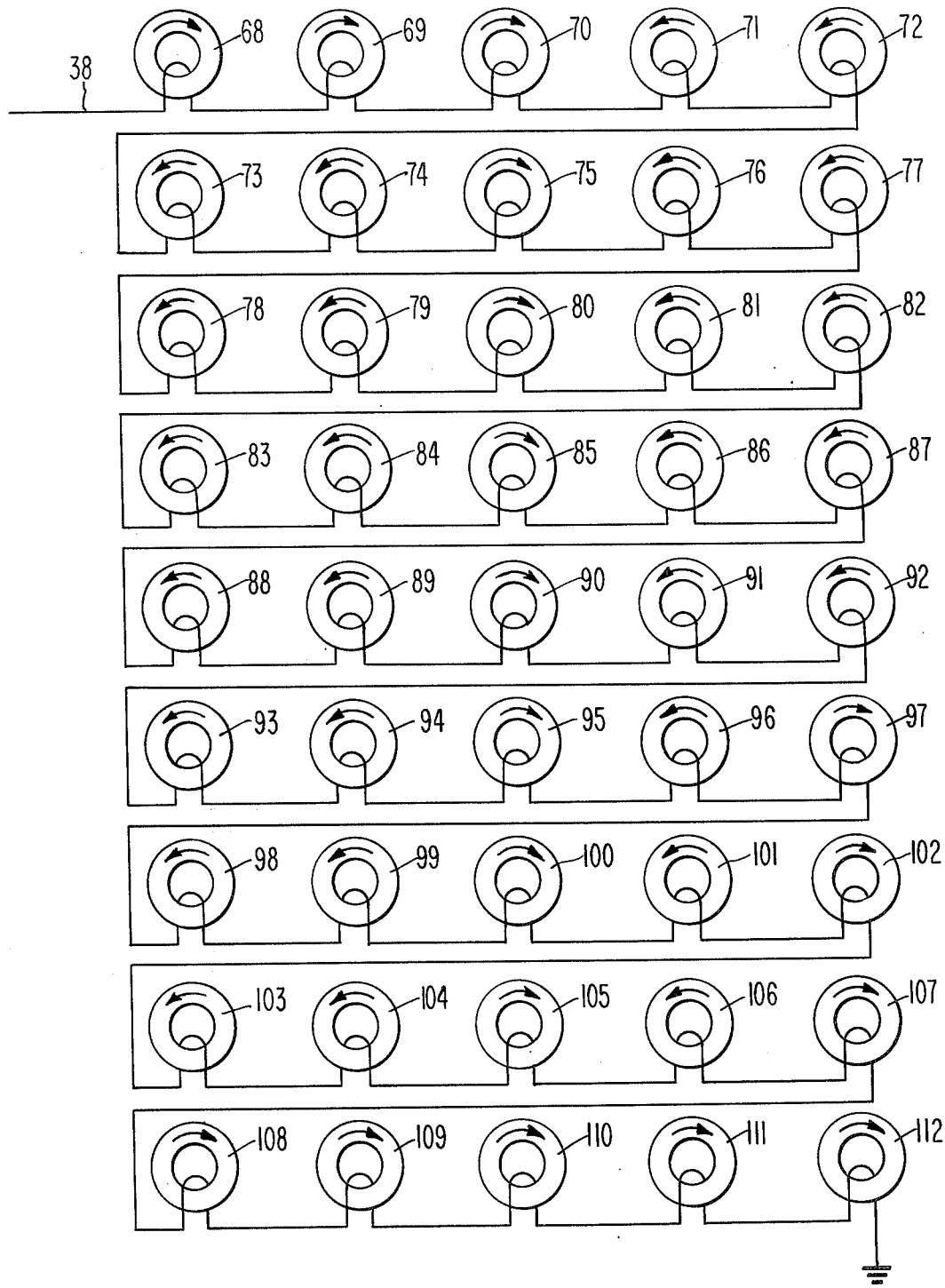
FIG. 3 shows an array of magnetic cores with one sense line and the windings for that one sense line being shown so wound to detect the numeral one.

The linear magnetic core array 34 is threaded with a group of sense lines. There is one sense line for each of the different patterns to be recognized. For example, the sense line 38, as depicted in FIG. 3 has windings on each of the magnetic cores, but the windings are wound, or connected, in a pattern for recognizing the numeral 1. The windings for each sense line are connected in series with certain windings in each set being aiding and other windings in the set being opposing so that the pattern of flux transitions in the cores causes voltages on the windings which are additive on sense line 38 when signals closely representing the numeral one are applied to the drivers 32.

Figure 4:
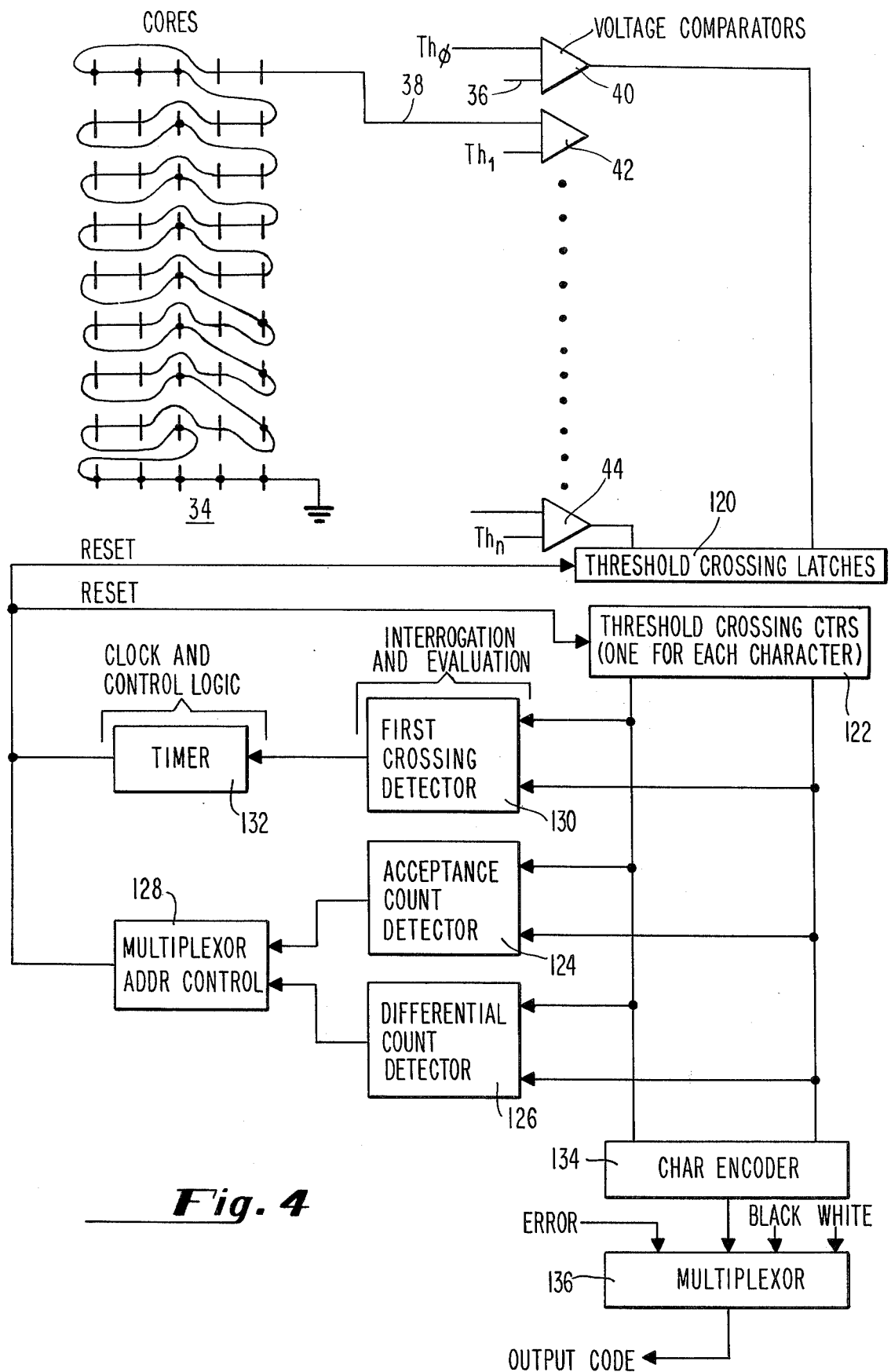
FIG. 4 shows the circuitry connected to the magnetic core sense windings for determining which pattern is being recognized.

Likewise, in FIG. 4 sense line 36 is wound to recognize the numeral 1. This sense line has a winding on each of the 45 cores, each winding being connected in series, one to the next. In the first or bottom row of cores, the same windings are all wound in the same direction. For the second row of cores, the sense windings in columns 3 and 5 are similarly wound, but the windings on cores in columns 1, 2 and 4 are oppositely wound. It is to be noted that an alternative means of providing oppositely wound windings on the magnetic cores is to maintain a constant direction of core winding while varying the direction that these cores are serially connected in accordance with the pattern to be recognized.

A threshold voltage comparator 40 is provided for numeral zero, comparator 42 is provided for numeral 1, while similar comparators are provided for each of the patterns being recognized with the last character n being recognized by the comparator 44. The outputs of these comparators are applied to threshold crossing detect latches 120. These crossing detect latches, being collectively reset after each voltage inducement, will step the corresponding crossing counter whenever a threshold voltage is achieved on the sense line. The crossing counters 122, which are reset at each new pattern to be recognized, reflect the number of times the threshold voltage has been achieved through a series of binary counters, one series for each sense line.

Since the sense line voltage represents the degree of similarity between the pattern to be recognized and the given reference pattern, the crossing counters on each sense line reflect the number of times the pattern to be recognized was sufficiently close to the corresponding reference pattern. The outputs of these counters are applied to interrogation and evaluation logic 130, 124, 126 which produces the external output representing the character being detected.

FIG. 2 shows the input to the magnetic core array in detail. A document 50 is moved in the direction as shown in FIG. 1 (It will be appreciated that it is within the scope of this invention to maintain the document stationary while it is being scanned.) As the document moves, it is scanned along the line 52 which is transverse to the direction of movement. The scanner 10 produces a train of 128 analog pulses representing the relative lightness or darkness along the line 52. These analog pulses are digitized in the digitizer 56 to produce a bit train of L digital signals representing whether the 128 discrete points along the line 52 are black or white. This bit train of 128 bits is set into the shift register 14. As the document 50 continues to move, W successive trains of 128 bits are produced. The first bit train of 128 pulses is successively shifted to the registers designated ABCD of the group labeled 16. As the document motion continues, successive bit trains of 128 pulses are set into the shift register. Finally, 35 bit trains are set into the 35 shift registers which have been designated 14, 16, 18, 20, 22, 24, 26, 28, 30 and 31 in the drawings. Shift register 31 is useful only in that it allows for the entrapment of a given bit content of the 35 scans of an image by recirculating the output, back into shift register 14. In total, these registers represent one complete image area.

Once a complete image area has been stored in the shift registers, there are 128 × 35 or 4480 bits to be examined for the ultimate determination of the pattern represented. For purposes of conceptual clarification, this bit pattern shall be described as a rectangular grid "screen" wherein 128 bit lengths are correlative with the vertical dimension of the input image area while the 35 bit may be described as the horizontal dimension of the image area. When so viewed, the bits in the 128 × 35 grid which represent the darkened portion successively scanned will form a bit pattern directly reflecting the input image area.

It is to be noted, however, that the input image will be reflected on only a portion of the 128 × 35 grid. The input image itself is assigned a dimension of 63 × 35 bits since the pattern font is described on a 5 × 9 matrix wherein each intersection in turn includes a 7 × 7 matrix of image bits. As such, the actual image represented will be of an equal width but of slightly less than one-half the height of the rectangular 128 × 35 grid "screen". This feature represents one important aspect of the invention. Since the scanned vertical line is essentially 128 bits high whereas the image to be read itself is assigned to be only a 63 bit height, there is a vertical margin which permits a very wide tolerance for error. The image to be recognized may be positioned as high or low as one-half the image heigheth above or below the "expected" vertical orientation on a document scanned. Within this margin, the image to be recognized will be fully stored in the shift registers and thereby be fully represented somewhere between the top and the bottom of the conceptual 128 × 35 rectangular screen.

The means of image recognition involves the use of 45 drivers, each of which reflects the state of a bit at selective positions within the registers. On the conceptual grid, the 45 probes would be positioned so as to simultaneously test 45 bit positions on the 5 × 9 stroke matrix representing the input image. As each intersection on the 5 × 9 stroke matrix includes a 7 × 7 matrix of bit positions, it will be noted that only 1 bit position out of 49 in each such intersection will be tested at any one "reading". Furthermore, as to each reading, the 45 bits so read would be of the same relative location within each of the 45 stroke intersections. Thus, the first reading consists of the selective test of 45 bits, each bit located on the bottom, right-handed side of the 7 × 7 bit matrix within each of the 45 stroke intersections. A complete representative coverage of a font may thereby be accomplished in any such reading wherein the bit taken is regarded as a sample of the lightness or darkness of the entire intersection within the 5 × 9 matrix.

In actual operation, the above testing is accomplished by means of reading, at any one time, every seventh bit located in every seventh shift register. As depicted in FIG. 2, we note drivers are connected to points in every seventh shift registers 14, 18, 22, 26 and 30 the contents of which represent periodically spaced, non-adjacent scans. The remaining shift registers 16, 20, 24 28 and 31 (for a total of 30) are not so connected. Furthermore, as to the shift registers 14, 18, 22, 26, 30 only selected points in such registers are connected to the drivers. As is highlighted by member 62, it is every seventh bit position in shift register 14, for example, that is so connected. A total of nine drivers thereby covers the 63 bit positions which fully include the height of the image (being a heighth of 9 intervals × 7 bits/ interval). In the rectangular grid with an image dimension of 63 × 35 bit positions, we see that the drivers thus reflect the state of every 7th bit position on a vertical line scanned. Furthermore, since it is only every seventh shift register that is so measured, this is conceptually viewed as testing every seventh line scanned along the horizontal. The net result is a driver connected to one out of every 49 points on the rectangular grid, with each point so tested being located in a different intersection and in the same relative location within each of such 45 intersections in a 5 × 9 stroke matrix.

Each driver has a drive line 58 which is connected to a corresponding magnetic core 60 within the magnetic core array 34. In this manner, each of the 45 drivers in shift registers 14, 18, 22, 26 and 30, are connected through the drive lines to a magnetic core so as to correspond with the relative position reflected by the input position from the input image.

The drivers 32 apply, through the drive lines, a voltage to the magnetic cores in the array 34, reflecting the value of the bits corresponding to that driver location. In the preferred embodiment, a value of 0 in the bit, representing a blank spot will produce a negative voltage whereas a value of 1, representing a dark spot, will produce a positively biased voltage. This voltage, in turn, then produces a flux change in the corresponding magnetic core so that if the driver connected to the drive line 58 represents a dark spot, the resulting positive voltage would produce a given flux on magnetic core 60 whereas if it were a white spot, this flux would be precisely of the opposite orientation. The final result of the operation is a pattern of flux changes on a magnetic core array which reflects the value of the selected bits within the bit train and which precisely correspond to the relative lightness and darkness of the input image at the points chose on a 5 × 9 stroke matrix.

The manner and operation of the sense lines is shown in FIG. 3 wherein the sense line 36a is wound through the magnetic cores to reflect the one. It is to be noted that the direction of the connection is changed from core to core in a manner corresponding to the anticipated shape. Thus, cores 68, 69, 70, 75, 80, 85, 90, 95, 97, 100, 102, 105, 107, 108, 109, 110, 111, and 112 are connected in an "over and under" manner whereas cores 71, 72, 73, 74, 76, 77, 78, 79, 81, 82, 83, 84, 86, 87, 88, 89, 91, 92, 93, 94, 96, 98, 99, 101, 103, 104 and 106 are connected in an "under and over" manner. This connection thus establishes a perfect "one" wherein all the cores representing the points which are expected to be dark are connected in one direction while the remaining points are connected in precisely the opposite direction. Similarly connected on the magnetic array are additional sense lines, each uniquely wound about the magnetic core array so as to describe the corresponding pattern. All of the cores representing the pattern are connected in one direction while the remaining cores are wound in the opposite manner.

To effect the recognition process itself, the pattern of flux changes within the magnetic core array is simultaneously applied to all sense windings via the magnetic cores. It is to be preliminarily noted that, as to any one magnetic core, there exists a given magnetic flux direction which is a function of the value of the image bit corresponding to the driver for that core. That particular flux direction will tend to induce a voltage upon the sense lines connected through that core. However, the polarity of that voltage on a sense line depends upon both the direction of flux as well as the direction of the sense line threading through that core. Thus, a positive voltage will be induced on the sense line for a given magnetic core where the direction of flux corresponds to the direction of connection of the sense line through the core. A negative voltage is induced where they are opposed. The effect of the process is to add voltages on a particular sense line whenever the actual flux pattern induced by the drivers on the magnetic core corresponds to the anticipated shape of a given pattern. Similarly, when the patterns do not coincide as to any one magnetic core, a negative voltage will be induced on the sense line at that core. As such, the sum of the voltage on any sense line is additive so as to be a function of the number of times the flux pattern induced by the drivers coincides with the threaded pattern so represented by that sense line. Thus, in FIG. 3, the sense line representing the numeral one yields a maximum positive voltage when the flux induced by the drivers on each of the 45 cores is of the same direction as that of the threaded direction on the sense line.

The above process of reducing a given flux reversal pattern to a voltage amplitude on each of the sense lines which is a function of the similarity of the image to the pattern represented by that sense line, is continually applied as the bit train of digital signals is advanced to the shift registers. As depicted in FIG. 2, the bit trains will advance through the shift registers in an orderly fashion. Thus, a bit located in shift register 14 may or may not be located at a tap point. However, a bit located within the expanded section 62 most assuredly will appear at such a tap point within seven advances and thus be projected upon a magnetic core and evaluated by the above procedure. When a bit advances to the final tap in shift register 14, the next advancement will shift it to the first position in the next shift register 16a bearing no taps. In this manner, eventually all bits appear at all of the taps, at which time all points in the bit train will have been "projected" upon the magnetic cores.

FIG. 4 depicts the final process of evaluating the resulting series of voltage readings on the sense lines. As for any one magnetic core projection, the voltages on the sense lines are compared by voltage comparators 40–44 to determine whether they exceed some threshold voltage by means of the appropriate threshold control 45. Once a threshold voltage has been crossed on a given sense line, the corresponding crossing detect latch(es) 120 will be set indicating that there is a sufficient degree of similarity between the pattern to be recognized and the reference pattern for that particular sample. After each such sample, the crossing detect latches will be reset and the appropriate crossing counter 122 will be stepped. This procedure is continued until sufficient positions on the 7 × 7 matrix representing a complete stroke intersection have been so tested on the magnetic core array.

Since these counts are constantly subjected to an interrogation and evaluation stage, a determination is made as to which, if any, of the reference patterns resembles the pattern to be recognized consistently enough to be deemed its proper representation. This determination rests upon two primary factors. First the counts must achieve a certain minimum number which is predetermined. The acceptance count detector 124 is thus activated only when the requisite number of minimum counts are achieved for a given pattern to be recognized. Second, those counts that do reach the minimal level must be of a sufficient differential less than the minimal count to warrant a positive conclusion. The differential count detector 126 activates the multiplexer address control 128 when this differential is achieved. Only when these two criteria are met the reference character so represented be passed through the multiplexer 136 to the user. It is to be noted that in the event the either criterion is not met an error signal will be sent through the multiplexer. In this connection, a timer 132 which is actuated by a first threshold crossing determines the maximum allowable time within which a pattern is to be recognized. Its purpose is to define when one pattern to be recognized ends and another begins by resetting the threshold crossing counters and sending out the error signal in the event no pattern is recognized.

Although a particular embodiment of the invention has been shown and described, it will be understood that various modifications may be made without departing from the true spirit and scope of the claims. The appended claims are, therefore, intended to cover all such modifications.

What is claimed is:

1. A pattern recognition system, comprising:
   means for scanning a region of a document W times for producing analog signals representing the relative darkness of areas of the document in said region;
   digitizing means coupled to said means for scanning for digitizing said analog signals to produce a bit train of L digital signals for each of the W scans which digital signals represent whether discrete points of a scanned document are either light or dark;
   register means coupled to said digitizing means for receiving and sequentially storing said trains of digital signals, said register means at any one time storing bit positions representing all W scans at sequential locations, the said trains of digitial signals representing a pattern to be recognized;
   sensing means coupled only to periodically spaced bit positions in said register means, said periodically spaced positions being occupied by digital signals from only periodically spaced, non-adjacent scans, said sensing means including
   a plurality of magnetic cores, and
   a plurality of drivers for effecting flux changes in ones of said cores, each of said cores being coupled to at least one driver; and
   a group of sense lines coupled to said magnetic cores, one sense line for each of the different reference patterns for outputting signals indicative of a particular, recognized pattern.

2. The pattern recognition system of claim 1 wherein said drivers are unipolar drivers, said sense lines being wound on selective magnetic cores representing said pattern to be recognized.

3. The pattern recognition system of claim 1 wherein said drivers are bipolar drivers, said sense lines being directionally connected to said windings so that said voltages on said windings are additive on said sense line when said signals representing said pattern to be recognized correspond with said reference pattern and are subtractive on said sense line when said signals and said reference pattern do not correspond.

4. The pattern recognition system of claim 1 wherein said sense line for each of said reference patterns is threaded on said magnetic cores, said magnetic cores being connected in a uniform manner, said magnetic cores including windings wound in a direction corresponding with said reference pattern.

5. A pattern recognition system according to claim 1, wherein said register means comprises at least one shift register comprising tap points at selected locations thereon, said drivers being connected to said tap points so as to effect selective sampling of said digital signals in said shift register.

6. The pattern recognition system of claim 5 wherein said selective sampling is applied to a progression of said digital signals in said register means to produce a series of voltages on each of said sense lines, said voltages reflecting the similarity of said pattern to be recognized and said reference patterns for each of said selective sampling.

7. The pattern recognition system of claim 6 wherein said sense lines each have connected thereto:
   a threshold detector,
   a plurality of counters one connected to each threshold detector to measure the number of voltage threshold crossings,
   a means for interrogating said number of voltage threshold crossings to determine the most appropriate reference pattern.

8. The systen recited in claim 7 wherein said drive windings and said sense windings on each core are arranged to perform a logical exclusive-OR function at each magnetic core, the series connection of said windings being means for summing said exclusive-OR functions for a plurality of magnetic cores.

9. A pattern recognition system, comprising:

a scanner for sequentially scanning a document and outputting a train of analog signals representing the relative darkness of areas so scanned;

digitizing means coupled to said scanner for converting said analog signals resulting from each scan to L digital signals;

register means for sequentially receiving said digital signals, said register storing signals from W scans at any given time to thereby constitute a digital signal image matrix of W bits by L bits;

a group of magnetic cores arrayed in a stroke matrix of X points by Y points, wherein L is at least twice as great as Y and W is at least twice are great as X;

driver means for coupling ones of said magnetic cores to non-adjacent digital signals of non-adjacent ones of the W scans stored in said register means; and logic means coupled to said magnetic cores for outputting signals indicative of the recognition of a character.

* * * * *